(12) United States Patent
Zhong et al.

(10) Patent No.: US 11,431,815 B1
(45) Date of Patent: Aug. 30, 2022

(54) MINING PROXY ACCELERATION

(71) Applicant: Xilinx, Inc., San Jose, CA (US)

(72) Inventors: Guanwen Zhong, Singapore (SG);
Haris Javaid, Singapore (SG);
Chengchen Hu, Singapore (SG); Ji Yang, Singapore (SG); Gordon J. Brebner, Monte Sereno, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/869,321

(22) Filed: May 7, 2020

(51) Int. Cl.
| | |
|---|---|
| *H04L 67/56* | (2022.01) |
| *H04L 69/16* | (2022.01) |
| *H04L 45/302* | (2022.01) |
| *H04L 45/16* | (2022.01) |
| *H04L 69/324* | (2022.01) |

(52) U.S. Cl.
CPC .............. *H04L 67/28* (2013.01); *H04L 45/16* (2013.01); *H04L 45/306* (2013.01); *H04L 69/16* (2013.01); *H04L 69/324* (2013.01)

(58) Field of Classification Search
None
See application file for complete search history.

(56) References Cited

U.S. PATENT DOCUMENTS

| 11,057,188 B2* | 7/2021 | Nogayama | H04L 9/0637 |
|---|---|---|---|
| 2005/0068914 A1* | 3/2005 | Lee | H04N 21/2381 |
| | | | 370/312 |
| 2005/0276265 A1* | 12/2005 | Serna | H04L 12/18 |
| | | | 370/390 |
| 2019/0340361 A1* | 11/2019 | Daniel | H04W 12/35 |
| 2020/0013027 A1* | 1/2020 | Zhu | G06Q 20/0658 |
| 2020/0053109 A1* | 2/2020 | Lancioni | G06F 11/3006 |
| 2020/0104835 A1* | 4/2020 | Day | G06Q 30/0206 |
| 2021/0083876 A1* | 3/2021 | Harms | H04L 63/00 |
| 2021/0103923 A1* | 4/2021 | Condron | H04L 9/088 |
| 2021/0266174 A1* | 8/2021 | Snow | H04L 9/3239 |

OTHER PUBLICATIONS

Ruben Recabarren, et al., Hardening Stratum, the Bitcoin Pool Mining Protocol, Proceedings on Privacy Enhancing Technologies, pp. 1-18, Mar. 20, 2017.
https://coinmarketcap.com, 6 pages, dated Feb. 4, 2020.
Guanwen Zhong, et al., FastProxy: Hardware and Software Acceleration of Stratum Mining Proxy, 4 pages, Jun. 24-26, 2019.
https://en.bitcoin.it/wiki/Stratum_mining_protocol, Stratum mining protocol, 5 pages, dated Feb. 4, 2020.

* cited by examiner

*Primary Examiner* — Anh Vu H Ly
(74) *Attorney, Agent, or Firm* — Kevin T. Cuenot

(57) ABSTRACT

Mining proxy acceleration may include receiving, within a mining proxy, packetized data from a mining pool server and determining, using the mining proxy, whether the packetized data qualifies for broadcast processing. In response to determining that the packetized data qualifies for broadcast processing, the packetized data can be modified using the mining proxy to generate broadcast data. The broadcast data can be broadcast, using the mining proxy, to a plurality of miners subscribed to the mining proxy.

20 Claims, 10 Drawing Sheets

MINING PROXY ACCELERATION

TECHNICAL FIELD

This disclosure relates to implementing a mining proxy and miners within a computing environment configured for block chain operations.

BACKGROUND

The "Stratum Protocol" is a pooled mining protocol that replaces network based pooling servers by allowing clients to generate work. The Stratum Protocol has become the standard protocol for mining proxies in Proof-of-Work (PoW) based block-chain systems such as those supporting cryptocurrencies. In general, in implementing the Stratum Protocol, a mining proxy connects to an upstream mining pool server and also to downstream miners. The connections to the downstream miners are established as Transmission Control Protocol/Internet Protocol (TCP/IP) connections. The mining proxy receives jobs periodically from the mining pool server and sends the jobs to the miners. As the number of miners increases, the sending of jobs to the miners often becomes a bottleneck in the system. The number of miners connected to a mining proxy, for example, may number in the thousands.

SUMMARY

In one aspect, a method includes receiving, within a mining proxy, packetized data from a mining pool server, determining, using the mining proxy, whether the packetized data qualifies for broadcast processing, and in response to determining that the packetized data qualifies for broadcast processing, modifying, using the mining proxy, the packetized data to generate broadcast data. The method also includes broadcasting, using the mining proxy, the broadcast data to a plurality of miners subscribed to the mining proxy.

In another aspect, a system includes a processor configured to initiate operations. The operations include receiving packetized data from a mining pool server, determining whether the packetized data qualifies for broadcast processing, and, in response to determining that the packetized data qualifies for broadcast processing, modifying the packetized data to generate broadcast data. The operations also include broadcasting the broadcast data to a plurality of miners subscribed to the mining proxy.

In another aspect, a mining proxy includes a processor configured to perform one or more administrative operations, a sniffer circuit coupled to the processor, wherein the sniffer circuit is configured to determine whether packetized data received from a mining pool server qualifies for broadcast processing, and a broadcaster circuit configured to modify the packetized data to generate broadcast data in response to determining that the packetized data qualifies for broadcast processing. The mining proxy also includes a dispatcher circuit configured to provide the broadcast data to a network interface for broadcast to a plurality of miners subscribed to the mining proxy.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
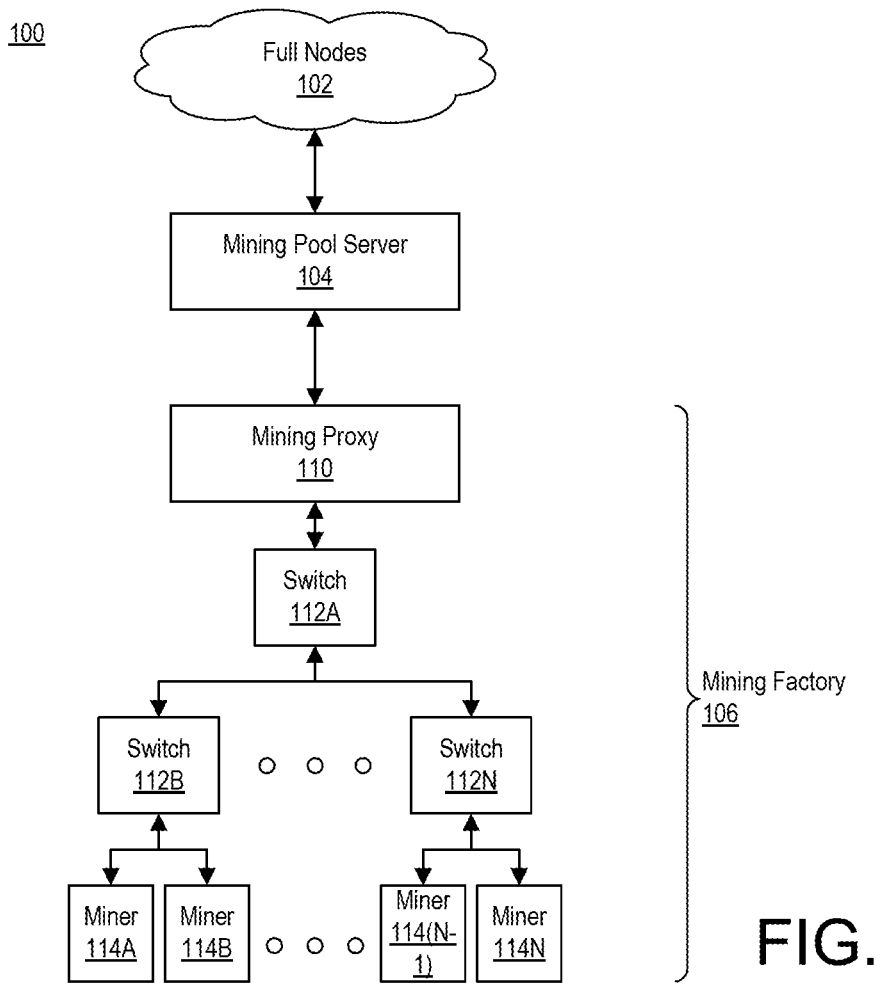
FIG. 1 illustrates a computing environment including an example of a mining factory.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to implementing a mining proxy and miners within a computing environment configured for block chain operations. An example of a computing environment for use with block chain operations is one configured to mine for cryptocurrency. Within a computing environment configured for block chain operations, miners often pool resources to share processing power over a network. Typically, the miners, operating as part of a mining factory, split any reward that is awarded for work performed for the block chain. An example mining factory includes a mining proxy and a plurality of miners. The mining proxy serves as an intermediary between a mining pool server and the miners. The number of miners included in the mining factory may number in the thousands.

The mining proxy connects to the upstream mining pool server and to the downstream miners. Typically, the connections from the mining proxy to the upstream mining pool server and the connections from the mining proxy to the downstream miners are established as Transmission Control Protocol/Internet Protocol (TCP/IP) connections. The mining proxy receives jobs periodically from the mining pool server and sends the jobs to the miners via the TCP/IP connections. As the number of miners grows large, however, the sending of jobs to the miners often becomes a bottleneck in the system as the mining proxy must establish a TCP/IP connection with each miner to send the job to each respective miner. Establishing a TCP/IP connection to each of what may be tens of thousands of miners is time consuming. Given the nature of the mining operations, e.g., being the first to arrive at a solution, the bottleneck can substantially hinder performance of the mining proxy and the mining factory in general.

In accordance with the inventive arrangements described within this disclosure, example architectures are provided for the mining proxy. Example architectures are also provided for the miners. The example architectures are capable of significantly accelerating the sending and receiving of jobs between the mining proxy and the miners. In one aspect, the architectures utilize a broadcast mechanism such as the layer 2 broadcast mechanism used in Ethernet-based networks and/or switches. For example, the broadcast mechanism may be used by the mining proxy to send jobs received from the mining pool server to the miners in lieu of establishing a TCP/IP connection with each miner.

The broadcast functionality may be implemented in a mining proxy using one or more different architectures. In one aspect, the broadcast functionality in a mining proxy may be implemented using a processor executing software in cooperation with dedicated hardware circuits configured to perform special functions. In another aspect, the broadcast functionality in a mining proxy may be implemented using a processor executing software without any dedicated hardware circuits. Broadcast receiving functionality (e.g., the ability to receive broadcasts) may be implemented within the miners as a combination of hardware and software. For example, the broadcast receiving functionality may be implemented using a processor executing software in cooperation with dedicated hardware circuits configured to perform specialized functions. The example architectures described within this disclosure allow the mining proxy to broadcast jobs to the miners and allow the miners to handle and process incoming jobs broadcast from the mining proxy.

The example architectures for mining proxies described within this disclosure can provide an increase in speed of approximately 2000 times that of conventional mining proxies that rely on TCP/IP connections to communicate jobs to miners.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates a computing environment 100 including an example of a mining factory. Computing environment 100 may be used to implement a block chain and, as such, perform block chain operations. In one aspect, computing environment 100 is capable of performing operations such as mining for cryptocurrency. In one example, computing environment 100 is configured to operate using a communication protocol such as the Stratum Protocol or other Proof-of-Work (PoW) based block chain and/or cryptocurrency protocol.

In the example of FIG. 1, computing environment 100 includes full nodes 102 coupled to mining pool server 104. Mining pool server 104 may be implemented as a computer or a server. An example of a computer or server that may be used to implement mining pool server 104 is described in connection with FIG. 12. Mining pool server 104 may couple to one or more mining factories such as mining factory 106. Mining factory 106 includes a mining proxy 110, one or more switches 112, and one or more miners 114.

In the example of FIG. 1, mining pool server 104 is coupled to mining proxy 110. Mining proxy 110 is coupled to miners 114A, 114B, 114(N−1) through 114N by way of switches 112A, 112B, through 112N. In one aspect, switches 112 may be implemented as Local Area Network (LAN) switches. Miners 114 may be implemented as any of a variety of different types of devices, including, but not limited to, computers (e.g., the example computer of FIG. 12), System-on-Chips (SoCs), programmable integrated circuits (ICs) such as Field Programmable Gate Arrays (FPGAs), Application Specific Integrated Circuits (ASICs), ICs including any combination of processor, programmable logic, and/or hardwired circuit blocks, or other types of circuitry. A single IC may include a plurality of miners. It should be appreciated that mining factory 106 may be larger than the arrangement shown having many more switches and many more miners than illustrated in FIG. 1. Mining factory 106 may include miners 114 that number in the thousands, for example.

Within mining factory 106, miners 114 are communicatively linked to mining proxy 110 via one or more of switches 112. In one aspect, mining factory 106 is characterized in that connections between mining proxy 110 and miners 114 flow through switches 112 and not through any routers. For example, mining proxy 110 and miners 114 may be connected solely through and/or using switches 112. In many cases, miners 114 are physically co-located with mining proxy 110, e.g., are located in a same data center or geographic location.

In the example of FIG. 1, full nodes 102 represent computing devices that are capable of downloading blocks and/or transactions of the block chain and checking such transactions and/or blocks against consensus rules. Full nodes 102 are capable of submitting new transactions to mining pool server 104. In general, mining pool server 104 is capable of creating new blocks out of the new transactions through interaction with mining factory 106. Mining pool server 104 is capable of sending the new block information to full nodes 102 for propagation to the entire blockchain network.

In illustration, mining pool server 104 may send jobs to mining proxy 110. For example, mining pool server 104 may send a job every minute to mining proxy 110. Mining proxy 110 is capable of communicating with miners 114 on behalf of mining pool server 104 and communicates with mining pool server 104 on behalf of miners 114. Mining proxy 110 distributes jobs from mining pool server 104 to miners 114. As discussed, the broadcast functionality in mining proxy 110 may be implemented using a processor executing software in cooperation with dedicated hardware circuits configured to perform special functions or, in the alternative, using a processor executing software without any dedicated hardware circuits.

In general, jobs sent to miners 114 by mining proxy 110 are the same, e.g., identical. This allows mining proxy 110 to utilize and leverage a broadcast mechanism such as the layer 2 broadcast mechanism (e.g., broadcast over LAN) for selected, e.g., periodic, communications with miners 114 instead of using TCP/IP connections. As noted, using a TCP/IP connection between mining proxy 110 and each miner 114 does not scale particularly when the number of miners numbers in the thousands. In conventional mining pools, however, acceleration efforts have largely focused on miners 114 effectively ignoring the network aspects of the system. In those cases where efforts focus on the mining proxy, attempts have been made to deploy multiple mining proxies. Deploying multiple mining proxies, however, is not cost effective and involves significant system maintenance. The example architectures described herein can significantly increase the processing speed of the mining proxy and/or miners allowing the mining proxy to service many miners without incurring the bottleneck in performance encountered when using TCP/IP connections with the miners.

Figure 2:
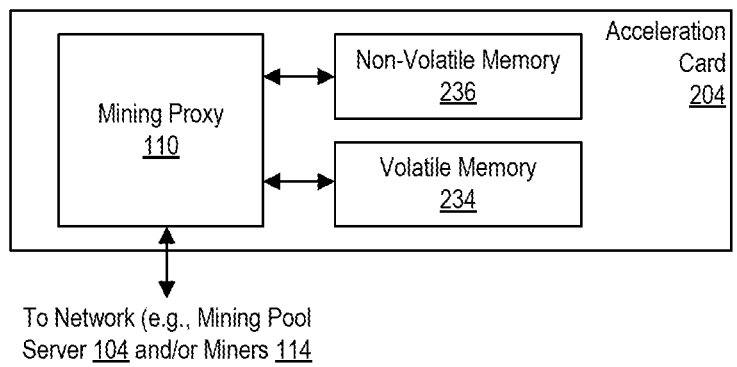
FIG. 2 illustrates an example implementation of a mining proxy.

FIG. 2 illustrates an example implementation of mining proxy 110. In the example of FIG. 2, mining proxy 110 is communicatively linked to mining pool server 104 and miners 114 via a network (e.g., an Ethernet connection through one or more intervening switches such as switches 112).

In one aspect, acceleration card 204 may be implemented as a circuit board that is communicatively linked to mining pool server 104 and miners 114 as described. Acceleration card 204 includes mining proxy 110. In one aspect, mining proxy 110 is implemented as an IC. The IC may be implemented using entirely hardwired circuitry (e.g., as an ASIC), using entirely programmable logic, or a combination of hardwired circuitry and programmable logic. Example ICs that may be used to implement mining proxy 110 include, but are not limited to, a programmable IC such as an FPGA and ICs that include a processor (e.g., a CPU) capable of executing program code. The processor may be a hardwired processor or a processor implemented using programmable logic (e.g., a "soft processor").

In one aspect, mining proxy 110 may be coupled to a volatile memory 234 and a non-volatile memory 236. Volatile memory 234 may be implemented as a RAM that is external to mining proxy 110, but is still considered a "local memory" of mining proxy 110. Non-volatile memory 236 may be implemented as flash memory. Non-volatile memory 236 is also external to mining proxy 110 and may be considered local to mining proxy 110.

FIG. 2 is not intended to suggest any limitation as to the scope of use or functionality of the examples described herein. Acceleration card 204 is an example of a hardware platform that may be used to implement and/or support mining proxy 110.

Figure 3:
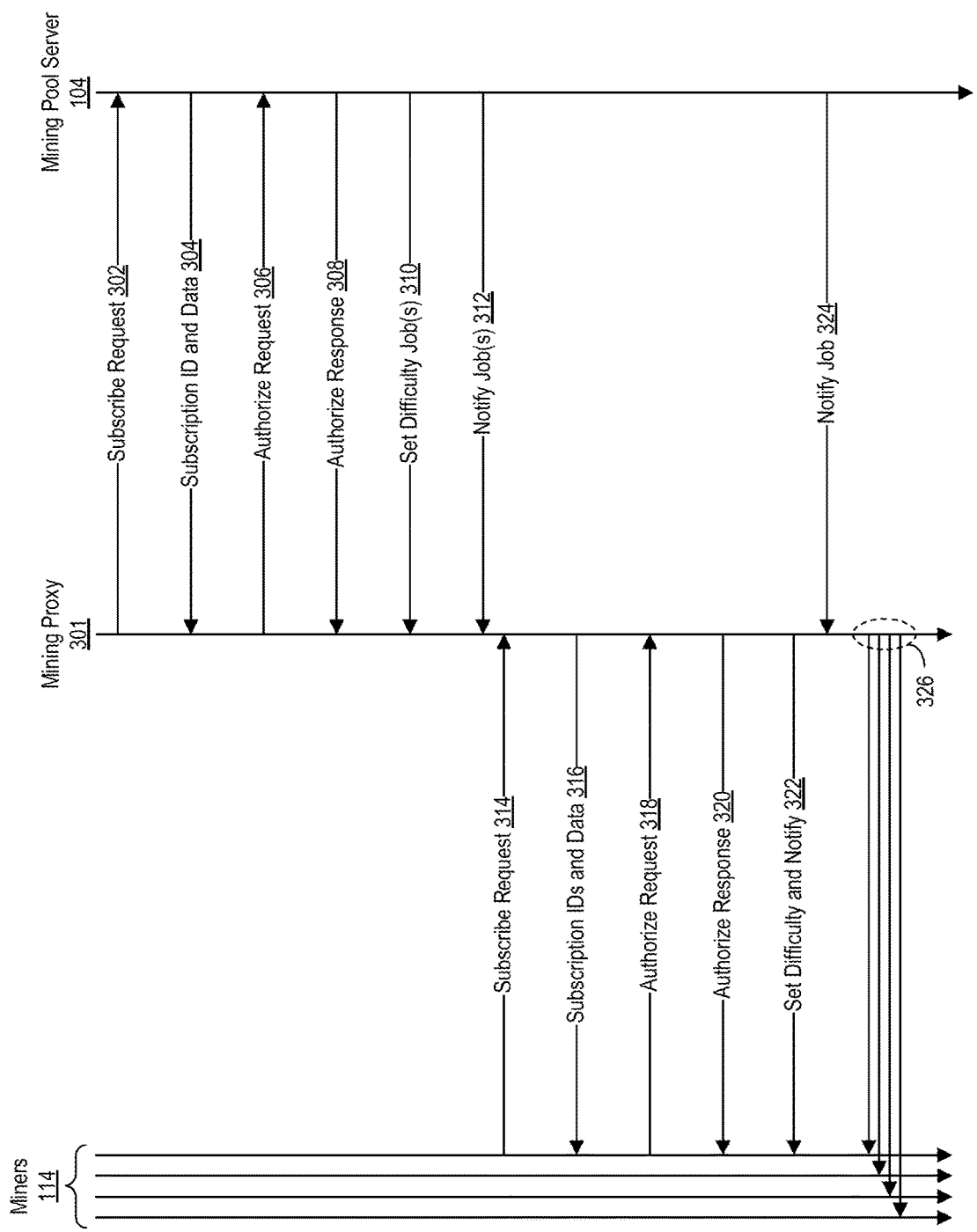
FIG. 3 is a signal flow diagram illustrating an example of a conventional implementation of a proxy protocol.

FIG. 3 is a signal flow diagram illustrating an example of a conventional implementation of a proxy protocol. The example of FIG. 3 illustrates the conventional case where the mining proxy utilizes a plurality of TCP/IP connections to distribute selected jobs to the miners.

In the example of FIG. 3, mining proxy 301, e.g., a conventional mining proxy, sends a subscribe request 302 to mining pool server 104. In response, mining pool server 104 sends a subscription identifier (ID) and data 304 to mining proxy 301. Subscription ID and data 304 may include extranonce data. For example, the IDs may include an ID for the difficulty subscription (difficulty subscription ID) and an ID for the mining subscription (mining subscription ID). The extranonce data may include extranonce settings.

Mining proxy 301 then authorizes itself with mining pool server 104 by sending authorize request 306. Authorization allows mining proxy 301 to later submit solutions to mining problems to mining pool server 104 in exchange for reward shares. Mining pool server 104, in response to authorize request 306, sends authorize response 308. Mining pool server 104 may then start sending set difficulty job(s) 310 (e.g., set_difficulty jobs) and notify job(s) 312 to mining proxy 301. Set difficulty job(s) 310 specify a difficulty number to be set in miners 114. Notify job(s) 312 may include a job_id, prev block hash, coinbase, merkle_branch, clean_jobs, and/or other messages.

As new miners 114 connect to mining proxy 301, each new miner 114 sends a subscribe request 314 to mining proxy 301. Mining proxy 301 returns subscription IDs and data 316 to each new miner 114 in response to the subscribe request 314 from each respective miner 114. The subscription IDs and data 316 are generated by mining proxy 301 itself and are not the same as the subscription IDs (e.g., subscription ID and data 304) received from mining pool server 104. That is, the subscription IDs may be of a same data type but have different values. Further, the subscription IDs and data 316 provided to each of the respective new miners 114 differ from one new miner to another. Thus, the subscription IDs and data 316 provided by mining proxy 301 are unique across miners 114 such that each miner 114 receives its own mining parameters that are unique with respect to the other miners 114.

Similar to mining proxy 301 authorizing itself with mining pool server 104, each miner 114 also authorizes itself with mining proxy 301 by way of sending authorize request 318. Mining proxy 301, in response to each authorize request 318 from a miner 114, sends an authorize response 320 to such miner 114.

In a steady-state scenario, mining proxy 301 sends incoming jobs from mining pool server 104 to miners 114 via TCP/IP connections. Mining proxy 301 sends two types of jobs to miners 114 via the TCP/IP connections. These jobs include a "set difficulty job" that directs a miner to use the supplied difficulty when solving the mining problem and a "notify job" that provides the miner with the job id, a list of Merkle branches, and other information to perform the mining operation. Although each of miners 114 gets the same job, each miner 114 performs a different mining operation based on the different/unique mining parameters provided to that miner 114 (e.g., subscription IDs and data 316) from mining proxy 301. In this figure, mining proxy 301 receives a notify job 324 from mining pool server 104 and sends the notify job 324 to all miners 114 via a TCP/IP connection 326 established with each respective miner 114.

Figure 4:
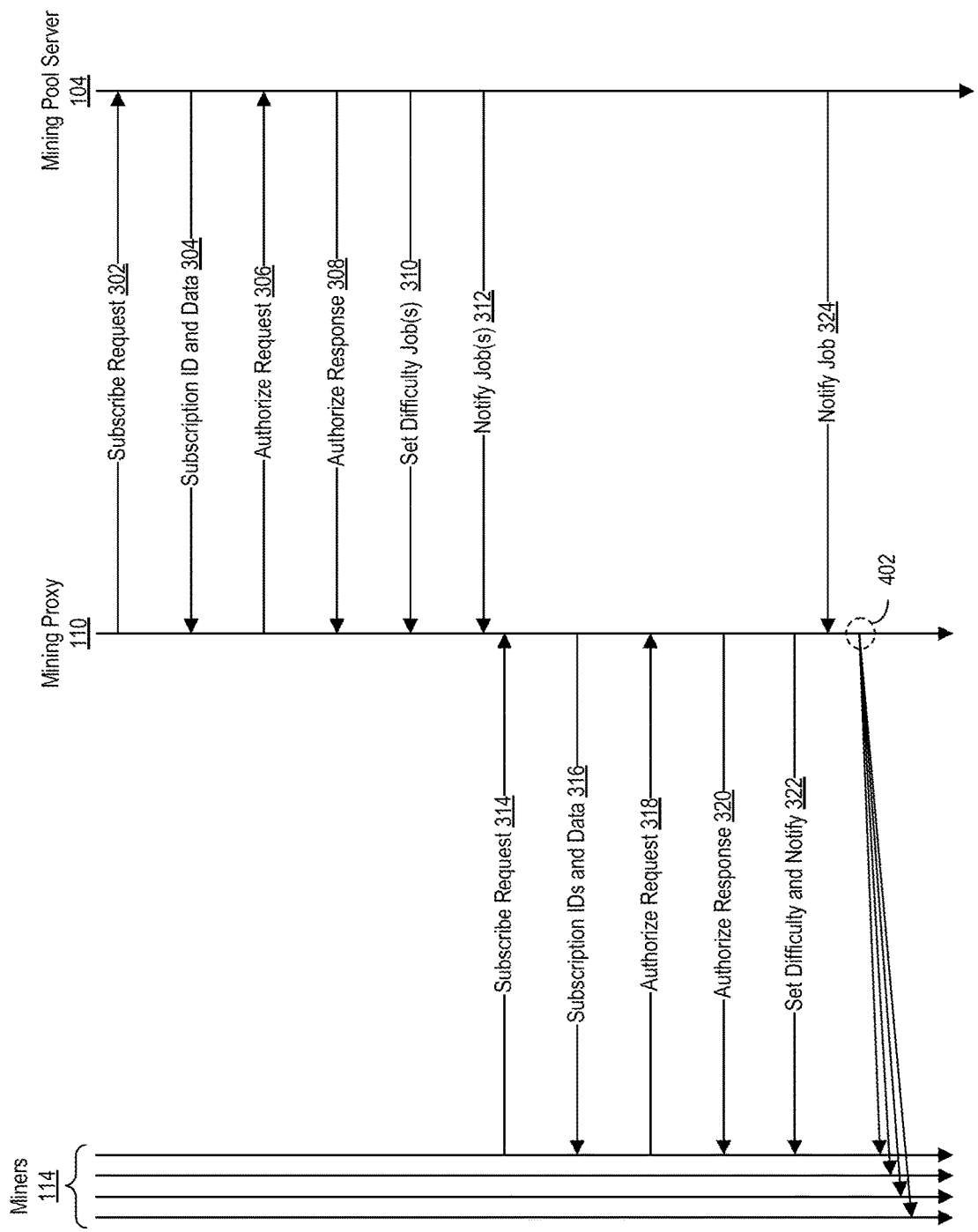
FIG. 4 is a signal flow diagram illustrating an example implementation of a proxy protocol using broadcasting.

FIG. 4 is a signal flow diagram illustrating an example implementation of a proxy protocol using broadcasting. The example of FIG. 4 illustrates an example implementation in accordance with the inventive arrangements described herein. In the example of FIG. 4, mining proxy 110 is used. In the example of FIG. 4, in response to receiving a new job shown as notify job 324 from mining pool server 104, mining proxy 110 is capable of performing one or more operations that differ from the conventional approach illustrated in FIG. 3 thereby providing improved performance.

For example, in response to receiving notify job 324 (e.g., a new job of a selected type), mining proxy 110 is capable of creating a layer 2 broadcast frame. The layer 2 broadcast frame has a payload containing and/or specifying the details of the new job (e.g., notify job 324). Mining proxy 110 is capable of broadcasting 402 the layer 2 broadcast frame out to all miners 114. All miners 114 communicatively linked with mining proxy 110 (e.g., by way of switches 112) receive the layer 2 broadcast frame and, as such, the new job from mining proxy 110. Typically, the term "frame" is used in connection with layer 2, e.g., Ethernet, while the term "packet" is associated with layer 3, e.g., IP. Layer 2, also referred to as the Data Link Layer, refers to the second layer in the OSI reference model.

By sending selected jobs to miners 114 as layer 2 broadcast frames, the entire TCP/IP kernel stack is bypassed thereby leading to faster and more efficient transmission of the selected jobs to miners 114. Further, the sending latency incurred between mining proxy 110 and miners 114 is reduced and is independent of the number of miners 114 in communication with mining proxy 110. In the case of FIG. 3 where a TCP/IP connection is established from mining proxy 301 to each miner to send the job, latency scales with the number of miners communicating with mining proxy 301 due to the need to establish a TCP/IP connection with each miner. In the case of FIG. 4, latency does not scale with the number of miners. Mining proxy 110, for example, is capable of sending jobs and communicating with thousands of miners. Further, the layer 2 broadcast mechanism, e.g., the generation and sending of layer 2 broadcast frames, can be implemented in software, hardware, or a combination thereof.

Figure 5:
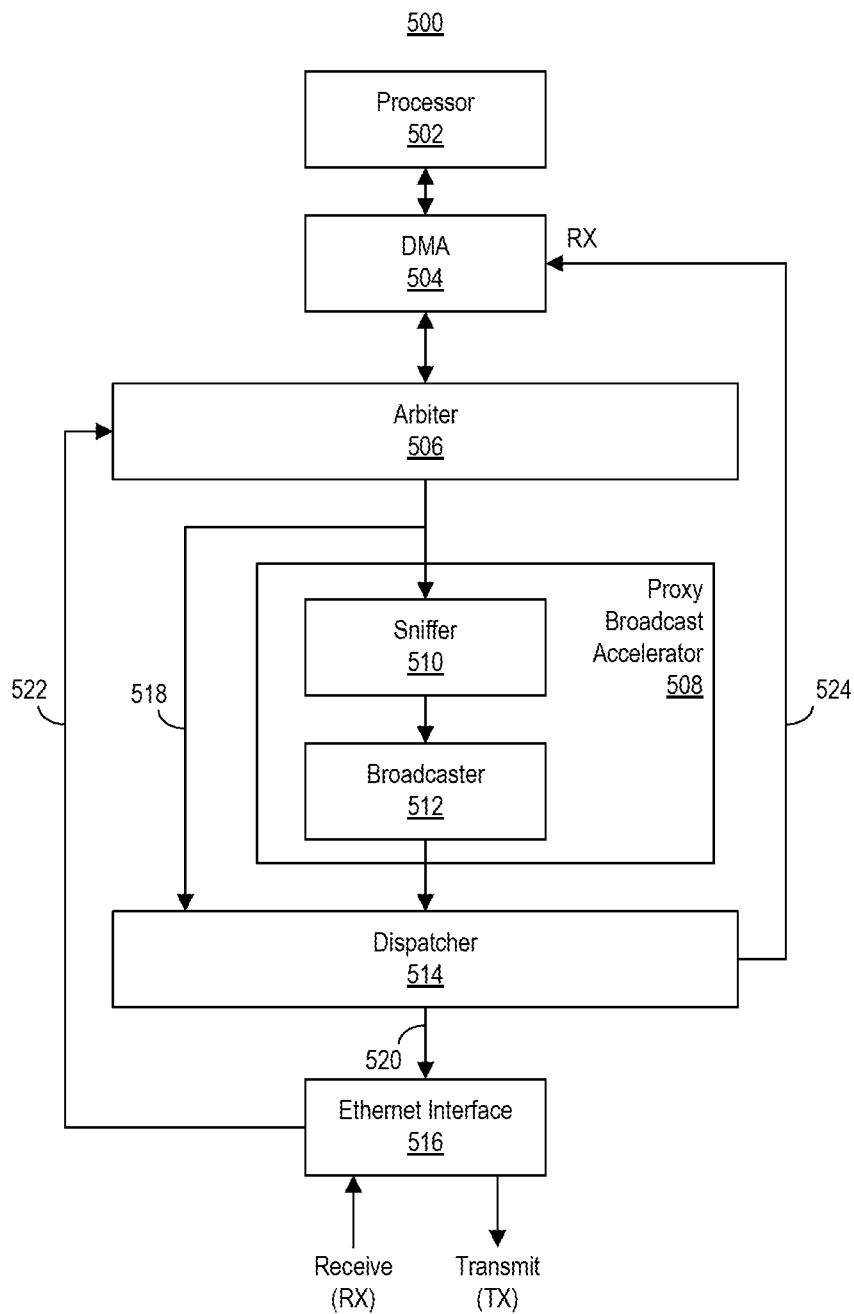
FIG. 5 illustrates an example of an architecture for implementing a mining proxy.

FIG. 5 illustrates an example of an architecture 500 for implementing a mining proxy. Architecture 500 may be used to implement mining proxy 110 as described in connection with FIGS. 1, 2, and 4. In the example of FIG. 5, each of the blocks shown may be implemented in circuitry, e.g., hardwired circuitry, programmable logic, or a combination thereof. Architecture 500 includes a processor capable of executing program code (e.g., instructions or software) and other dedicated circuit blocks.

In the example of FIG. 5, architecture 500 includes a processor 502 capable of executing program code, e.g., executable instructions. Processor 502 is coupled to a direct memory access circuit (DMA) 504. DMA 504 is coupled to an arbiter 506. Arbiter 506 is coupled to a proxy broadcast accelerator 508 and to a dispatcher 514. For example, arbiter 506 is coupled to a sniffer 510 within proxy broadcast accelerator 508 and to dispatcher 514. As illustrated, proxy broadcast accelerator 508 includes sniffer 510 coupled to a broadcaster 512. Broadcaster 512 is coupled to dispatcher 514. Dispatcher 514 is coupled to an Ethernet interface 516 and to DMA 504. Ethernet interface 516 is capable of transmitting data and receiving data via Ethernet over the network (e.g., to miners and/or to mining pool server 104).

Architecture 500 is capable of processing "selected" packets through proxy broadcast accelerator 508 and other packets, e.g., "non-selected" packets, without interruption and/or disruption from proxy broadcast accelerator 508. Examples of selected a packet include a packet specifying a selected type of job. Examples of selected types of jobs include a notify job and set difficulty job (also referred to as a "notify packet" or a "set difficulty packet"). In general, notify and set difficulty packets only come from upstream mining pools connected to architecture 500 via the network. The jobs are specified in the payload portion of the packets. Example formatting of the payload portion of a notify packet and the payload portion of a set difficulty packet is illustrated below in Table 1.

Table 1

/*Job notify format */
{"method": "mining.notify", "id": null, "params": ["job_id", "merkle branches", . . . ]}
/*Job set_difficulty format */
{"method": "set_difficulty", "id": null, "params": [difficulty value]}

Non-selected packets, by comparison, are processed by effectively bypassing proxy broadcast accelerator 508. Non-selected packets may include any packets other than notify and/or set difficulty packets. Such packets, e.g., non-selected packets, include packets received over the network via Ethernet interface 516 in the receive direction and certain packets sent from processor 502 via DMA 504 in the transmit direction.

Regarding non-selected packets sent from processor 502 in the transmit direction, processor 502 sends such a packet to DMA 504. DMA 504 sends the packet to arbiter 506. Arbiter 506 is capable of directing the packet to dispatcher 514 via signal path 518. Dispatcher 514 directs the packet to Ethernet interface 516 via signal path 520. Ethernet interface 516 sends the packet out over the network via the transmit path. In this manner, by bypassing proxy broadcast accelerator 508, the non-selected packets are processed without interruption and/or disruption by proxy broadcast accelerator 508. The packets may be passed without modification by broadcast accelerator 508.

For a non-selected packet received by Ethernet interface 516 from the network over the receive path, Ethernet interface 516 directs the packet to arbiter 506 via signal path 522. Arbiter 506 is capable of directing the packet to dispatcher 514 via signal path 518 as previously described bypassing proxy broadcast accelerator 508. Dispatcher 514 directs the packet to DMA 504 via signal path 524. DMA 504 is capable of sending the packet to processor 502 for processing. Processor 502 is capable of sending the packet (e.g., packets for operations such as 302-310 and 314-322 of FIG. 3) via DMA 504 to arbiter 506. The packet may be sent to dispatcher 514 and out over the network via Ethernet interface 516 via the transmit path.

In one aspect, arbiter 506 is capable of sending any packet received from the network to both dispatcher 514 and to sniffer 510 in broadcast accelerator 508 (e.g., concurrently). The copy of the packet sent to dispatcher 514 is provided to DMA 504 via signal path 524 and then on to processor 502 for processing. Processor 502, for example, is capable of performing certain administrative operations such as generating initial requests and responses with respect to the mining proxy and the miners. As an illustrative and non-limiting example, the initial requests and responses may include one or more or all of operations 302, 304, 306, 308, 310, 314, 316, 318, 320, and/or 322. In some example implementations, processor 502 may be configured to execute metrics computation and collection operations such as determining the number of jobs that have been performed, determining the number of times a solution has been found, etc.

The copy of the packet provided to sniffer 510 is evaluated as described below to determine whether the packet is a selected packet. Examples of selected packets include notify and set difficulty packets. In general, sniffer 510 drops any packet that is not a selected packet. Any packet that is a selected packet is processed through proxy broadcast accelerator 508 as described in greater detail below. Thus, selected packets may be processed through both proxy broadcast accelerator 508 and via signal path 518 to dispatcher 514 as described.

In one aspect, sniffer 510 is capable of determining whether packetized data, e.g., packets, qualify for broadcast processing as performed by proxy broadcast accelerator 508. For example, sniffer 510 is capable of checking packets received from arbiter 506. Sniffer 510 is capable of checking each packet to determine whether the packet is a selected packet, e.g., a notify packet or a set difficulty packet. In response to determining that a packet is not a selected packet, sniffer 510 is capable of dropping the packet. In response to determining that a packet is a selected packet, sniffer 510 is capable of extracting the payload from the packet and sending the payload to broadcaster 512.

Broadcaster 512 is capable of modifying the packetized data to generate broadcast data. For example, broadcaster 512 is capable of constructing a layer 2 broadcast frame using the payload received from sniffer 510. Broadcaster 512 sends the generated layer 2 broadcast frame to dispatcher 514. Dispatcher 514 sends the layer 2 broadcast frame to Ethernet interface 516, which in turn broadcasts the layer 2 broadcast frame over the network via the transmit path.

In one aspect, arbiter 506 includes two input channels. One channel is capable of buffering packets received from processor 502 and the other channel is capable of buffering packets received from the network (e.g., from Ethernet interface 516). In an example implementation, each input channel is implemented as a first-in-first-out (FIFO) memory. Arbiter 506 may include an output channel that is capable of periodically selecting (e.g., choosing) packets from the two input channels. The output channel is capable of sending the packets obtained from the input channels to broadcast accelerator 508 and/or dispatcher 514 as described. In one aspect, the output channel is capable of selecting packets from the two input channels for output using a round-robin technique.

Sniffer 510 may include a finite state machine (FSM) that is capable of checking whether a packet has valid Ethernet, IP, and TCP headers. In response to detecting an invalid one of such headers, sniffer 510 is capable of dropping the packet. For a valid packet, sniffer 510 is capable of parsing the payload of the packet and, in doing so, searching for keywords such as "mining.notify" and "mining.set difficulty" or other text and/or symbols to determine whether the packet is one of the selected packet types. Once a selected packet is detected, sniffer 510 is capable of buffering the payload and signaling broadcaster 512 to construct a layer 2 broadcast frame using the extracted and buffered payload. Sniffer 510 is capable of discarding any packet other than a packet determined to be a selected packet type.

Broadcaster 512 is capable of generating a layer 2 broadcast frame. Broadcaster 512, for example, is capable of first determining whether a payload received from sniffer 510 has valid data. If, for example, an output FIFO of sniffer 510 is empty, broadcaster 512 may remain idle. In response to detecting a valid payload in the output FIFO of sniffer 510, broadcaster 512 is capable of constructing a layer 2 broadcast frame header by inserting the broadcast address "FF:FF:FF:FF:FF:FF" in the destination MAC address field. Broadcaster 512 is further capable of extracting the payload from the output FIFO of sniffer 510 and appending the payload to the generated layer 2 broadcast frame header to form a complete layer 2 broadcast frame. Broadcaster 512 may then provide the resulting layer 2 broadcast frame to dispatcher 514 for broadcasting over the network via Ethernet interface 516.

Dispatcher 514 may be implemented to include two input channels and two output channels. The input channels and output channels may be implemented using FIFOs. For example, one input channel is coupled to an output of broadcaster 512. The other input channel may be coupled to arbiter 506 by way of signal path 518. One output channel may be coupled to an input channel of Ethernet interface 516 by way of signal path 520. The other output channel may be coupled to an input channel of DMA 504 by way of signal path 524. In an example implementation, dispatcher 514 operates similar to a switch in that input data received over one of the two input channels may be directed/redirected to a particular one of the two output channels. For example, dispatcher 514 is capable of directing data sent from processor 502 via DMA 504 and signal path 518 to Ethernet interface 516 via signal path 520 for transmission over the network. Similarly, dispatcher 514 is capable of directing data received from broadcaster 512 to Ethernet interface 516 by way of signal path 520 for transmission over the network. For data received from the network via signal paths 522 and 518, dispatcher 514 is capable of directing the data to processor 502 by way of signal path 524.

In an example implementation, architecture 500 may be implemented in one or more interconnected ICs. In one aspect, architecture 500 may be implemented as an IC (e.g., a single IC such as a System-on-Chip (SoC)), having a processor and circuitry. The processor 502 and other circuit blocks illustrated in FIG. 5 may be implemented in the SoC as hardwired circuit blocks, as programmable logic circuit blocks, or a combination of both.

Using an architecture as described in connection with FIG. 5, the layer 2 broadcast operations may be offloaded to circuitry in the form of proxy broadcast accelerator 508. Proxy broadcast accelerator 508, for example, is capable of directly parsing each incoming packet (e.g., job) from the Ethernet interface, and sending selected ones of the jobs out using the layer 2 broadcast mechanism to all of the miners. Thus, architecture 500 effectively bypasses the entire TCP/IP network stack.

Given that the circuitry, whether hardwired or implemented using programmable logic, is capable of performing packet processing significantly faster than a processor executing program code, architecture 500 is capable of achieving a significant improvement in performance (e.g., processing speed) and scalability on the order of approximately 2,000× that of a conventional computer based mining proxy. Further, in the case of particular SoC/FPGA implementations, a low cost standalone FPGA board or other ASIC/IC board may be used, thereby providing a cost effective solution to deploying a mining proxy.

Figure 6:
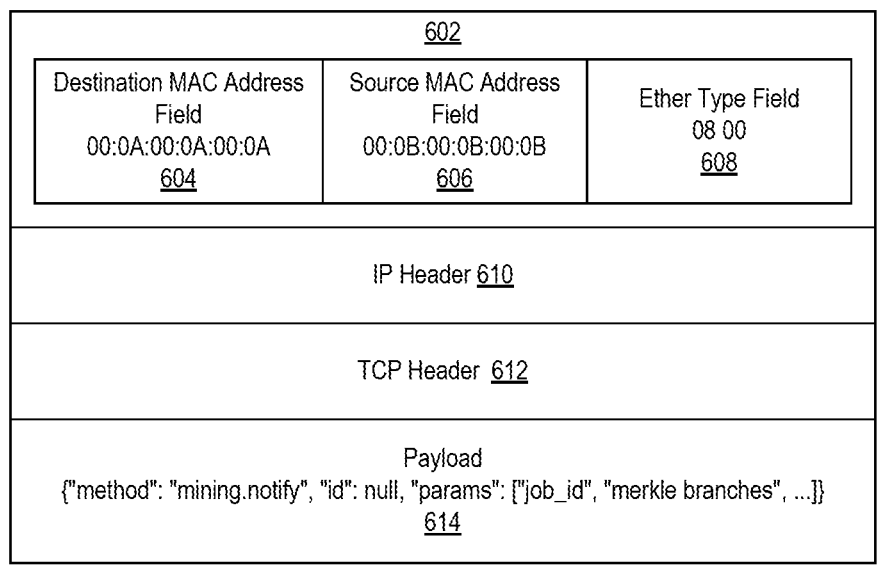
FIG. 6 illustrates an example of a selected packet that may be processed using a proxy broadcast accelerator as described in connection with FIG. 5.

FIG. 6 illustrates an example of a selected packet 600 that may be processed using a proxy broadcast accelerator as described in connection with FIG. 5. In the example of FIG. 6, packet 600 is an example notify packet. Packet 600 includes a MAC header 602 having a destination MAC address field 604, a source MAC address field 606, and an Ether Type field 608. Packet 600 further includes an IP header 610, a TCP header 612, and a payload 614.

Sniffer 510 is capable of detecting that packet 600 is a selected packet, e.g., a notify packet in this example. Sniffer 510, for example, may detect that packet 600 is a selected packet by parsing payload 614 as described to detect particular keywords, text, symbols, or the like. Sniffer 510, in detecting that packet 600 is a selected packet, is capable of removing or peeling MAC header 602, IP header 610, and TCP header 612 from packet 600 thereby extracting payload 614.

In one aspect, sniffer 510 is capable of removing destination MAC address field 604 and source MAC address field 606 from packet 600 and preserving Ether Type field 608 along with payload 614 to provide such information to broadcaster 512. In another aspect, sniffer 510 is capable of removing IP header 610 and TCP header 612 from packet 600 and providing MAC header 602 and payload 614 to broadcaster 512, wherein one or more of the fields of MAC header 602 may be overwritten.

Figure 7:
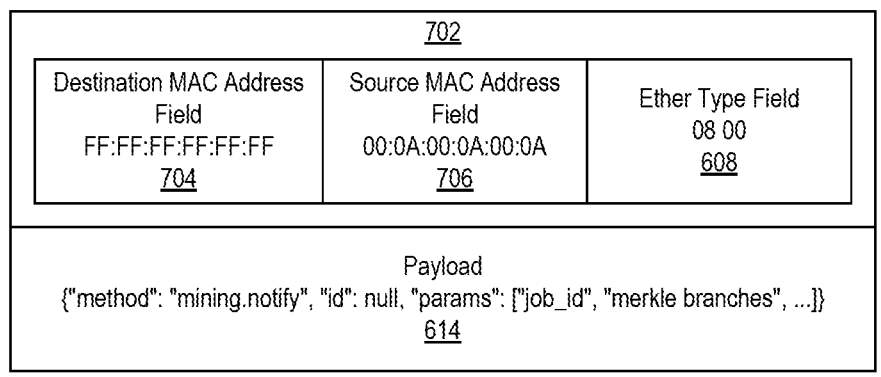
FIG. 7 illustrates an example of a layer 2 broadcast frame that may be generated by the broadcaster circuit of FIG. 5.

FIG. 7 illustrates an example of a layer 2 broadcast frame 700 that may be generated by broadcaster 512. In one example, broadcaster 512 is capable of generating MAC header 702 by creating MAC header 702 anew. In another example, broadcaster 512 is capable of generating MAC header 702 by generating destination MAC address field 704 and source MAC address field 706 and combining the two with Ether Type Field 606 of MAC header 602. In another example, broadcaster 512 is capable of generating MAC header 702 by overwriting destination MAC address field 604 and source mac address field 606 of MAC header 602.

In the example of FIG. 7, broadcaster 512 includes (e.g., writes) the address "FF:FF:FF:FF:FF:FF" into destination MAC address field 704. Broadcaster 512 may include the address of the mining proxy within source MAC address field 706. Ether Type field 608 may remain unchanged and include the same data as specified in MAC header 602. Broadcaster 512 further appends payload 614 to MAC header 702 to complete layer 2 broadcast frame 700.

Figure 8:
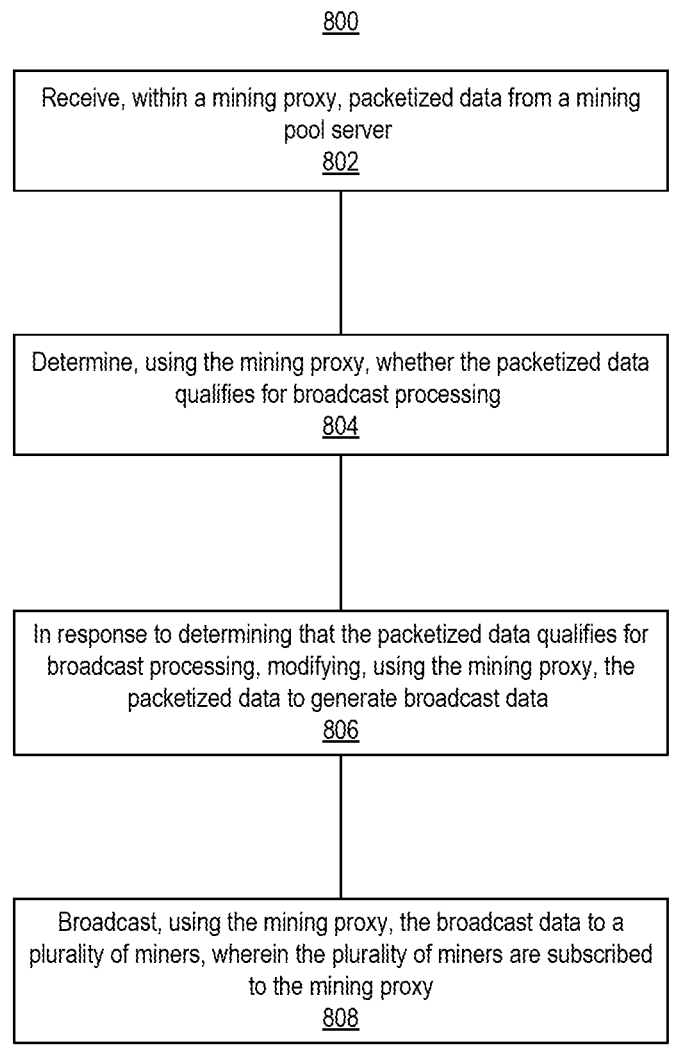
FIG. 8 illustrates an example method of operation for a mining proxy using a proxy broadcast accelerator.

FIG. 8 illustrates an example method 800 of operation for a mining proxy using a proxy broadcast accelerator. In one aspect, method 800 may be performed by a mining proxy as described in connection with FIGS. 1, 2, 4, 5, 6, and 7. The mining proxy may be implemented using hardware and software as described herein.

In block 802, packetized data is received within the mining proxy from a mining pool server. In block 804, the mining proxy is capable of determining whether the packetized data, e.g., a packet, qualifies for broadcast processing, e.g., is a selected packet. The term "broadcast processing" refers to the generation of a layer 2 broadcast frame in response to receipt of a packet determined to be a selected packet. Determining whether the packetized data qualifies for broadcast processing may include detecting that the packetized data specifies or includes a set difficulty job or a notify job.

In block 806, in response to determining that the packetized data qualifies for broadcast processing, the mining proxy is capable of modifying the packetized data (e.g., the selected packet) to generate broadcast data (e.g., a layer 2 broadcast frame). In one aspect, modifying the packetized data includes converting the packetized data into a layer 2 broadcast frame. For example, the packetized data may be converted by generating an Ethernet frame header having a destination MAC address field including a broadcast address, extracting a payload from the packetized data, and appending the payload to the Ethernet frame header. Generating the Ethernet frame header also may include including an address corresponding to the mining proxy in a source MAC address field.

The layer 2 broadcast frame may be generated by modifying the selected packet or by generating a new or partially new MAC header as described. The payload of the selected packet is appended to the MAC header, whether newly generated or re-purposed from the selected packet. As such, the layer 2 broadcast frame does not include either of an Internet Protocol header or a Transmission Control Protocol header.

In block 808, the mining proxy is capable of broadcasting the broadcast data (e.g., the layer 2 broadcast frame) to a plurality of miners. The plurality of miners are subscribed to the mining proxy. In one aspect, broadcasting includes sending the broadcast data to the plurality of miners using a layer 2 broadcast mechanism without Transmission Control Protocol operations from the mining proxy to each of the plurality of miners.

In an alternative implementation, method 800 may be performed by a mining proxy implemented using a computer without hardware circuit blocks as described in connection with FIG. 5. For example, such a mining proxy may be implemented as a computer or server, an example of which is provided in FIG. 12. In that case, the mining proxy may be implemented as software (e.g., suitable program code or executable instructions) executing on a processor (e.g., processor(s) 1206) to perform the operations described. In a software implementation, a kernel TCP/IP stack may be used to receive a selected packet. The processor then is capable of creating a layer 2 broadcast frame including the payload from the selected packet as described. The processor is capable of sending the layer 2 broadcast frame using a raw socket over the Ethernet interface from the mining proxy. While the software-based implementation does not provide the same level of increase in performance as the architecture of FIG. 5 using hardware circuit blocks, such an architecture still provides marked improvement over conventional mining proxies that utilize dedicated TCP/IP connections to each miner.

Figure 9:
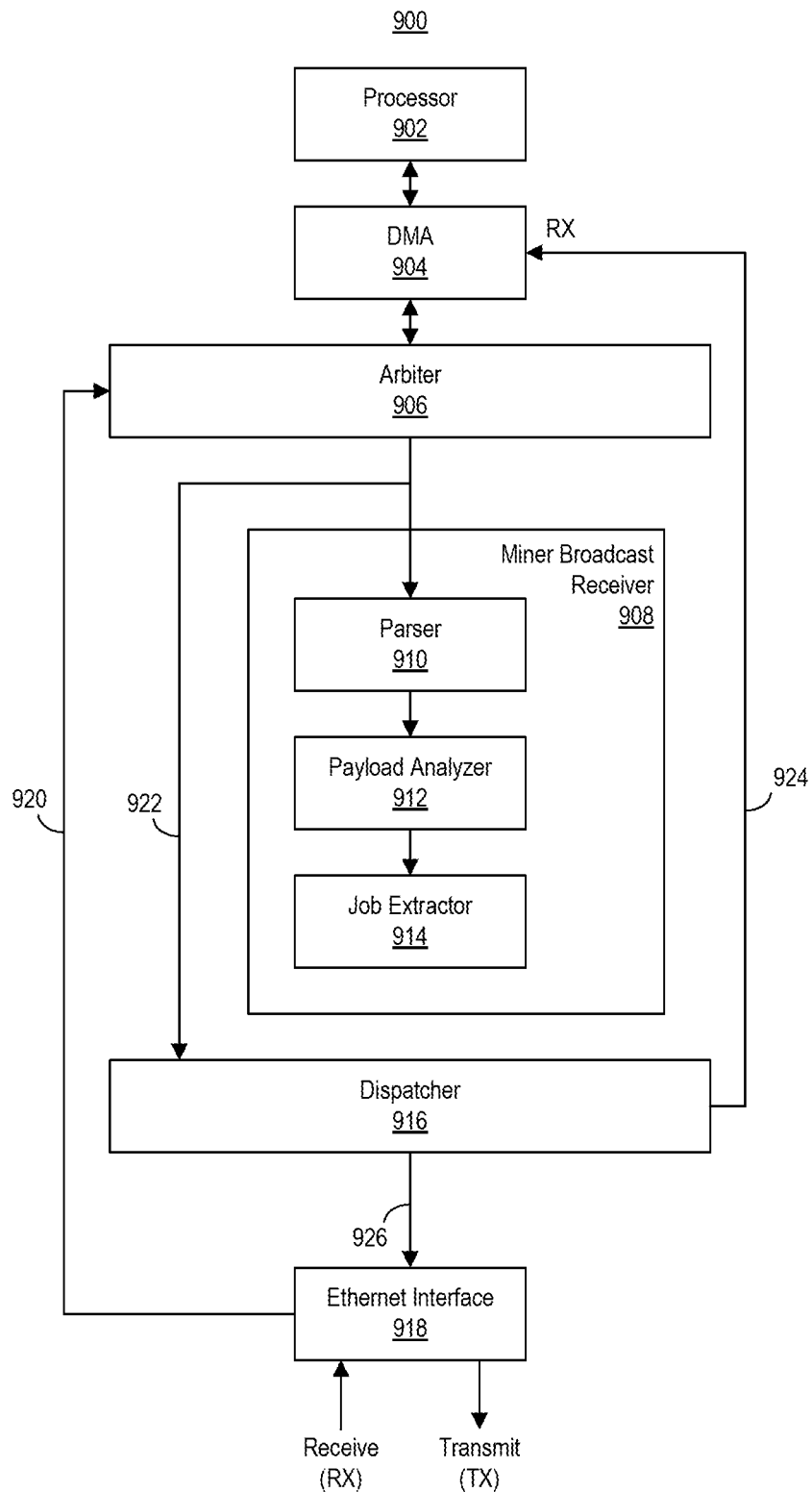
FIG. 9 illustrates an example architecture for implementing a miner broadcast receiver.

FIG. 9 illustrates an example architecture 900 for implementing a miner. Each block of FIG. 9 represents circuitry. Architecture 900 is an example of a hardware and software architecture in that a processor 902 is included.

In the example of FIG. 9, architecture 900 includes processor 902 capable of executing program code, e.g., executable instructions. Processor 902 is coupled to a DMA 904. DMA 904 is coupled to an arbiter 906. Arbiter 906 is coupled to a miner broadcast receiver 908 and to a dispatcher 916. For example, arbiter 906 is coupled to a parser 910 within mining broadcast accelerator 908 and to dispatcher 916. As illustrated, miner broadcast receiver 908 includes parser 910 coupled to payload analyzer 912, which is coupled to job extractor 914. Dispatcher 916 is coupled to an Ethernet interface 918 and to DMA 904. Ethernet interface 918 is capable of transmitting data and receiving data via Ethernet over the network (e.g., to mining proxy 110).

Architecture 900 is capable of processing layer 2 broadcast frames through miner broadcast receiver 908. Architecture 900 is capable of processing packets that are not layer 2 broadcast frames without interruption and/or disruption from miner broadcast receiver 908. In the example of FIG. 9, processor 902 is capable of performing certain administrative operations such as generating initial requests and responses with respect to mining proxy 110. As an illustrative and nonlimiting example, the initial requests and responses may include one or more or all of operations 314, 316, 318, 320, and/or 322.

Packets received via Ethernet interface 918 are provided to arbiter 906 via signal path 920. Arbiter 906 is capable of providing such packets to dispatcher 916 via signal path 922 and to parser 910 in miner broadcast receiver 908. In one aspect, arbiter 906 includes two input channels. One channel is capable of buffering packets received from processor 902 and the other channel is capable of buffering packets received from the network (e.g., from Ethernet interface 918). Each input channel may be implemented as a FIFO memory. Arbiter 906 may include an output channel that is capable of periodically selecting packets from the two input channels for sending to miner broadcast receiver 908 and/or dispatcher 916. In one aspect, the output channel is capable of selecting packets from the two input channels for output using a round-robin technique.

In an example implementation, arbiter 906 is capable of sending any packet received from the network to both dispatcher 916 and to parser 910 in miner broadcast receiver 908. The copy of the packet sent to dispatcher 916 is provided to DMA 904 via signal path 924 and then on to processor 902 for processing. The copy of the packet provided to parser 910 is evaluated as described below to determine whether the packet is a layer 2 broadcast frame.

Parser 910 is capable of sniffing (e.g., parsing) incoming data and detecting those data items that are layer 2 broadcast frames. For example, parser 910 may include an FSM configured to check whether received data are layer 2 broadcast frames. Parser 910 may drop data in response to determining that the data is not a layer 2 broadcast frame. In response to determining that a packet is a layer 2 broadcast frame, parser 910 passes the packet to payload analyzer 912.

Payload analyzer 912 is capable of determining whether the payload of the received data includes a selected type of job. For example, payload analyzer 912 may include an FSM configured to determine whether the payload of the data received from parser 910 includes a notify job or a set difficulty job. Payload analyzer 912 is capable of dropping the data in response to determining that the payload is not a selected type of job. In response to determining that the data includes is a selected type of job, payload analyzer 912 passes the data to job extractor 914.

Job extractor 914 is capable of extracting the payload from the data and writing the payload to a memory and/or memory location that is shared with the mining circuit(s) (not shown).

Dispatcher 916 may be implemented to include an input channel and two output channels. The input channel and the output channels may be implemented using FIFOs. For example, the input channel is coupled to an output channel of arbiter 906 by way of signal path 922. One output channel may be coupled to an input channel of Ethernet interface 918. The other output channel may be coupled to an input channel of DMA 904 by way of signal path 924. In an example implementation, dispatcher 916 operates similar to a switch in that input data received over the input channel may be directed/redirected to a particular one of the two output channels. For example, dispatcher 916 is capable of directing data sent from processor 902 via DMA 904 and signal path 922 to Ethernet interface 918 via signal path 926 for transmission over the network. For data received from the network via signal paths 920 and 922, dispatcher 916 is capable of directing the data to processor 902 by way of signal path 924.

Figure 10:
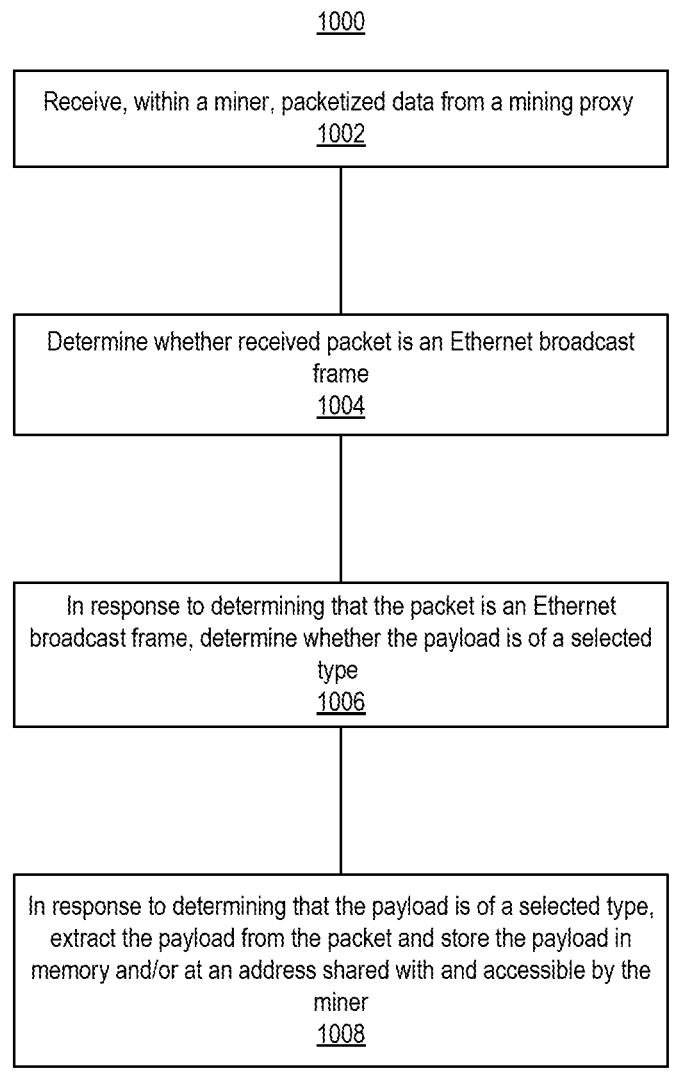
FIG. 10 illustrates an example method of operation for a miner using a miner broadcast receiver.

FIG. 10 illustrates an example method 1000 of operation for a miner using a miner broadcast receiver. In block 1002, the miner receives data from a mining proxy. In block 1004, the miner broadcast receiver of the miner determines whether a received data, which may include packetized data, is a layer 2 broadcast frame. In block 1006, in response to determining that the received data is a layer 2 broadcast frame, the miner broadcast receiver determines whether the payload of the received data is of a selected type, e.g., a selected type of job such as a notify job or a set difficulty job. In block 1008, in response to determining that the payload is of the selected type, the miner broadcast receiver extracts the payload from the data and stores the payload in a memory and/or at a memory location that is shared with and accessible by the mining circuits.

Figure 11:
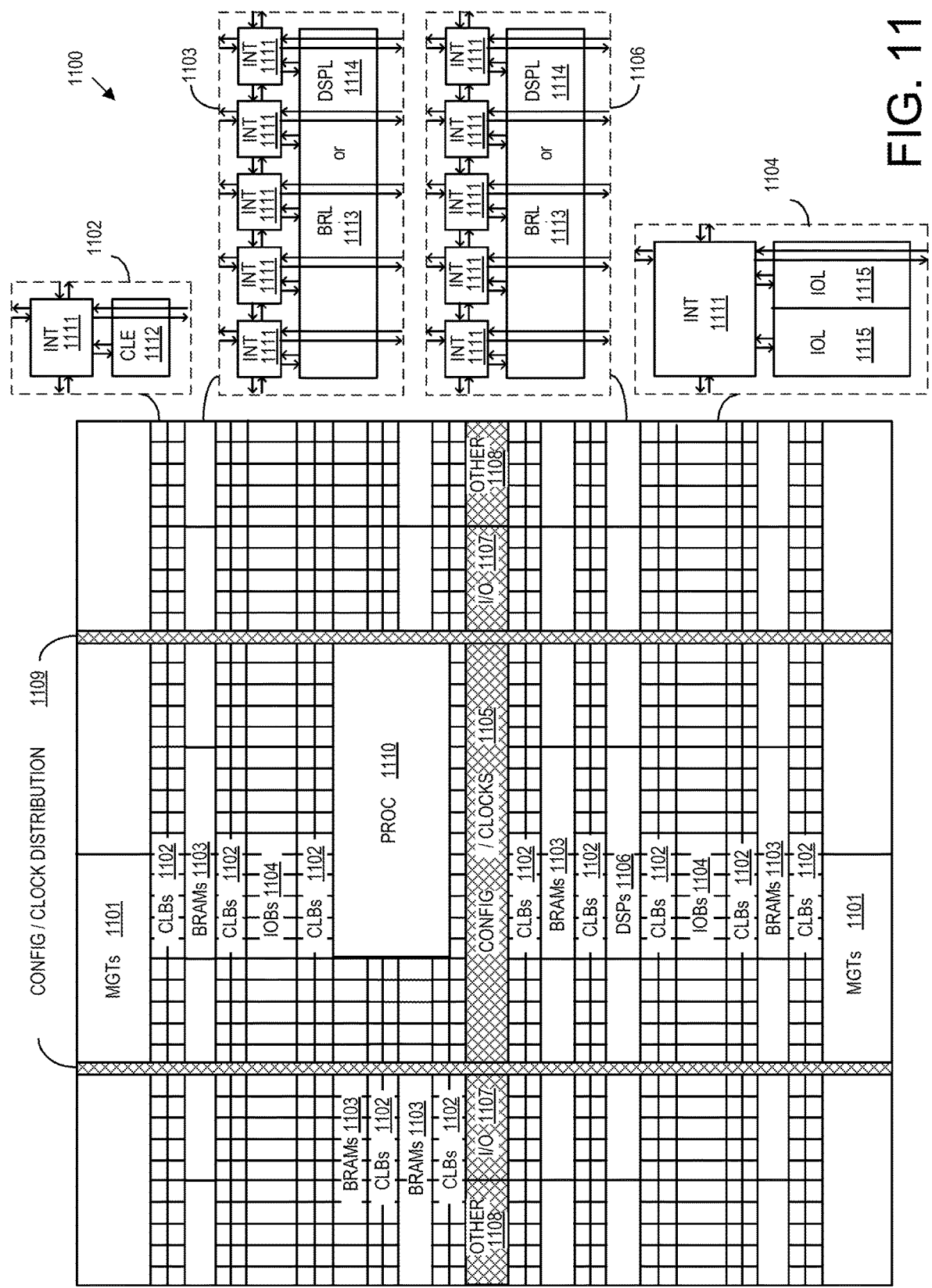
FIG. 11 illustrates an example architecture for an IC that may be used to implement various aspects of the example implementations described within this disclosure.

FIG. 11 illustrates an example architecture 1100 for an IC. In one aspect, architecture 1100 may be implemented within a programmable IC. For example, architecture 1100 may be used to implement an FPGA. Architecture 1100 may also be representative of an SoC type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1100 includes several different types of programmable circuit, e.g., logic, blocks. For example, architecture 1100 may include a large number of different programmable tiles including multi-gigabit transceivers (MGTs) 1101, configurable logic blocks (CLBs) 1102, random access memory blocks (BRAMs) 1103, input/output blocks (IOBs) 1104, configuration and clocking logic (CONFIG/CLOCKS) 1105, digital signal processing blocks (DSPs) 1106, specialized I/O blocks 1107 (e.g., configuration ports and clock ports), and other programmable logic 1108 such as digital clock managers, analog-to-digital converters, system monitoring logic, and so forth.

In some ICs, each programmable tile includes a programmable interconnect element (INT) 1111 having standardized connections to and from a corresponding INT 1111 in each adjacent tile. Therefore, INTs 1111, taken together, implement the programmable interconnect structure for the illustrated IC. Each INT 1111 also includes the connections to and from the programmable logic element within the same tile, as shown by the examples included at the right of FIG. 11.

For example, a CLB 1102 may include a configurable logic element (CLE) 1112 that may be programmed to implement user logic plus a single INT 1111. A BRAM 1103 may include a BRAM logic element (BRL) 1113 in addition to one or more INTs 1111. Typically, the number of INTs 1111 included in a tile depends on the height of the tile. As pictured, a BRAM tile has the same height as five CLBs, but other numbers (e.g., four) also may be used. A DSP tile 1106 may include a DSP logic element (DSPL) 1114 in addition to an appropriate number of INTs 1111. An 10B 1104 may include, for example, two instances of an I/O logic element (IOL) 1115 in addition to one instance of an INT 1111. The actual I/O pads connected to IOL 1115 may not be confined to the area of IOL 1115.

In the example pictured in FIG. 11, a horizontal area near the center of the die, e.g., formed of regions 1105, 1107, and 1108, may be used for configuration, clock, and other control logic. Vertical areas 1109 extending from this horizontal area may be used to distribute the clocks and configuration signals across the breadth of the programmable IC.

Some ICs utilizing the architecture illustrated in FIG. 11 include additional logic blocks that disrupt the regular columnar structure making up a large part of the IC. The additional logic blocks may be programmable blocks and/or dedicated (e.g., hardwired) circuitry. For example, a processor block depicted as PROC 1110 spans several columns of CLBs and BRAMs. In an example implementation, PROC 1110 is capable of executing applications, e.g., user applications.

In one aspect, PROC 1110 may be implemented as a hardwired processor that is fabricated as part of the die that implements the programmable circuitry of the IC. PROC 1110 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1110 may be omitted from architecture 1100 and replaced with one or more of the other varieties of the programmable blocks described. Further, such blocks may be utilized to form a "soft processor" in that the various blocks of programmable circuitry may be used to form a processor that can execute program code as is the case with PROC 1110.

The phrase "programmable circuitry" or "programmable logic" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 11 that are external to PROC 1110 such as CLBs 1102 and BRAMs 1103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1110.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1110 or a soft processor. In some cases, architecture 1100 includes a dedicated configuration processor that loads the configuration bitstream to the appropriate configuration memory and/or processor memory. The dedicated configuration processor does not execute user-specified program code. In other cases, architecture 1100 may utilize PROC 1110 to receive the configuration bitstream, load the configuration bitstream into appropriate configuration memory, and/or extract program code for execution.

FIG. 11 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 11 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1110 within the IC are for purposes of illustration only and are not intended as limitations.

Architecture 1100 may be used to implement the example architectures of FIGS. 5 and 9. Processor 1110 may implement processor 502 or 902 as the case may be. As discussed, processor 1110 may be hardwired or implemented using programmable logic. In other example implementations, architecture 1100, with processor 1110 omitted, may be used to implement the architectures of FIGS. 5 and 9 where an external processor (e.g., off-chip) is coupled to architecture 1100 to implement processor 502 or 902 as the case may be.

Figure 12:
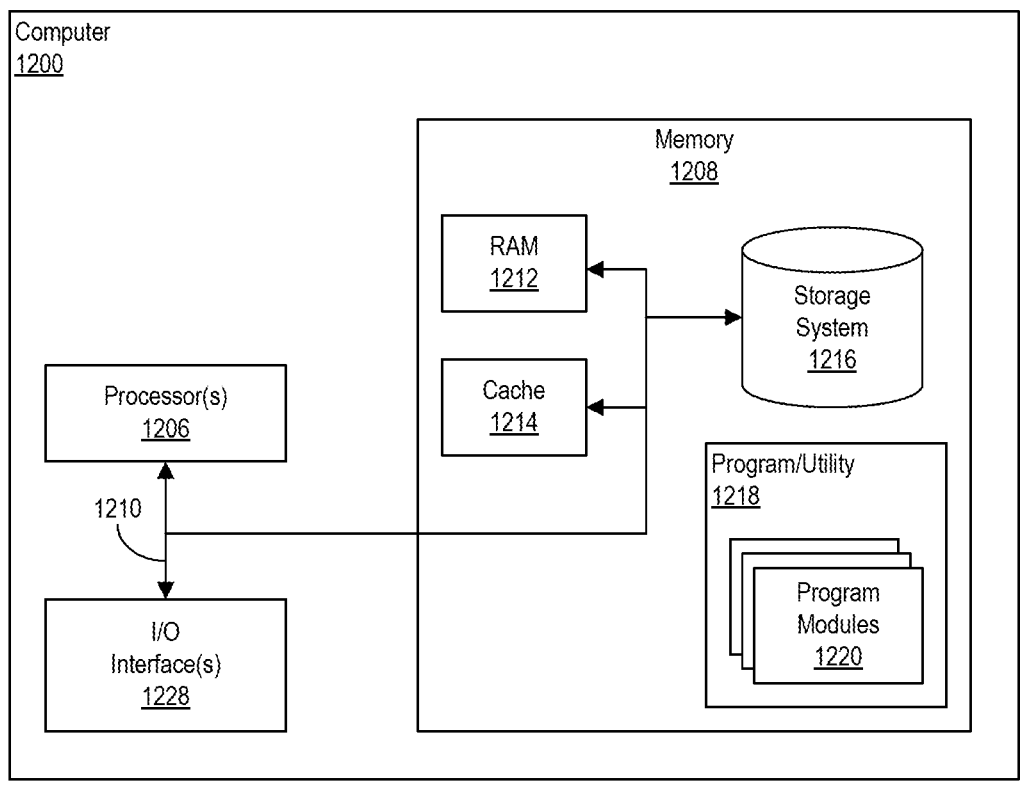
FIG. 12 illustrates an example of a computer that may be used with the inventive arrangements described within this specification.

FIG. 12 is an example of a computer 1200. Computer 1200 may be used to implement the mining pool server and/or a mining proxy in the case of a software implementation as described herein. In another aspect, computer 1200 may be used to implement miners. Computer 1200 is only one example implementation of a computing system that can be used in a standalone capacity, as part of a computing cluster, or as a cloud computing node. The example of FIG. 12 is not intended to suggest any limitation as to the scope of use or functionality of the example implementations described herein. Computer 1200 is an example of a system and/or computer hardware that is capable of performing the various operations described within this disclosure.

The components of computer 1200 may include, but are not limited to, one or more processors 1206 (e.g., CPUs), a memory 1208, and a bus 1210 that couples various system components including memory 1208 to processor(s) 1206. Processor(s) 1206 may include any of a variety of processors that are capable of executing program code. Example processor types include, but are not limited to, processors having an x86 type of architecture (IA-32, IA-64, etc.), Power Architecture, ARM processors, and the like.

Bus 1210 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 1200 typically includes a variety of computer readable media. Such media may be any available media that is accessible by computer 1200 and may include any combination of volatile media, non-volatile media, removable media, and/or non-removable media.

Memory 1208 may include computer readable media in the form of volatile memory, such as RAM 1212 and/or cache memory 1214. Computer 1200 may also include other removable/non-removable, volatile/non-volatile computer system storage media. By way of example, storage system 1216 may be provided for reading from and writing to a non-removable, non-volatile magnetic and/or solid state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 1210 by one or more data media interfaces. Memory 1208 is an example of at least one computer program product having a set (e.g., at least one) of program modules (e.g., program code) configured to carry out the functions and/or operations described within this disclosure.

For example, program/utility 1218 includes a set (at least one) of program modules 1220. Program modules 1220, being stored in memory 1208, may include, but are not limited to, an operating system, one or more application programs (e.g., user applications), other program modules, and/or program data. Program modules 1220 generally carry out the functions and/or methodologies as described herein at least with respect to operations performed by computer 1200.

Program/utility 1218 is executable by processor(s) 1206. Program/utility 1218 and any data items used, generated, and/or operated upon by host processor(s) 1206 are functional data structures that impart functionality when employed by host processor(s) 1206. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 1200 may include one or more Input/Output (I/O) interfaces 1228 communicatively linked to bus 1210. I/O interface(s) 1228 allow computer 1200 to communicate with external devices, couple to external devices that allow user(s) to interact with computer 1200, couple to external devices that allow computer 1200 to communicate with other computing devices, and the like. For example, computer 1200 may be communicatively linked to a mining proxy, miners, and/or a mining pool server. Computer 1200 may be coupled to other external devices such as a keyboard and/or display (not shown) via I/O interface(s) 1228. Examples of I/O interfaces 1228 may include, but are not limited to, network cards, modems, network adapters, hardware controllers, etc. In an example implementation, the I/O interface 1228 through which computer 1200 communicates with other devices may be an Ethernet interface.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a method can include receiving, within a mining proxy, packetized data from a mining pool server, determining, using the mining proxy, whether the packetized data qualifies for broadcast processing, and in response to determining that the packetized data qualifies for broadcast processing, modifying, using the mining proxy, the packetized data to generate broadcast data. The method also can include broadcasting, using the mining proxy, the broadcast data to a plurality of miners subscribed to the mining proxy.

The foregoing and other example implementations each may optionally include one or more of the following features, alone or in combination. Some example implementations include all the following features in combination.

In another aspect, determining whether the packetized data qualifies for broadcast processing includes detecting that the packetized data includes a set difficulty job or a notify job.

In another aspect, the broadcasting includes sending the broadcast data to the plurality of miners using a layer 2 broadcast mechanism without performing Transmission Control Protocol operation from the mining proxy to each of the miners.

In another aspect, modifying the packetized data includes converting the packetized data into a layer 2 broadcast frame.

In another aspect, the layer 2 broadcast frame does not include an Internet Protocol header and does not include a Transmission Control Protocol header.

In another aspect, converting the packetized data includes generating an Ethernet frame header having a destination MAC address field including a broadcast address, extracting a payload from the packetized data, and appending the payload to the Ethernet frame header.

In another aspect, generating the Ethernet frame header includes including an address corresponding to the mining proxy in a source MAC address field.

In one aspect, a system includes a processor configured to initiate operations. The operations include receiving packetized data from a mining pool server, determining whether the packetized data qualifies for broadcast processing, and, in response to determining that the packetized data qualifies for broadcast processing, modifying the packetized data to generate broadcast data. The operations also include broadcasting the broadcast data to a plurality of miners subscribed to the mining proxy.

The foregoing and other example implementations each may optionally include one or more of the following features, alone or in combination. Some example implementations include all the following features in combination.

In another aspect, determining whether the packetized data qualifies for broadcast processing includes detecting that the packetized data includes a set difficulty job or a notify job.

In another aspect, broadcasting includes sending the broadcast data to the plurality of miners using a layer 2 broadcast mechanism without performing Transmission Control Protocol operation from the mining proxy to each of the miners.

In another aspect, modifying the packetized data includes converting the packetized data into a layer 2 broadcast frame.

In another aspect, the layer 2 broadcast frame does not include an Internet Protocol header and does not include a Transmission Control Protocol header.

In another aspect, the converting the packetized data includes generating an Ethernet frame header having a destination MAC address field including a broadcast address, extracting a payload from the packetized data, and appending the payload to the Ethernet frame header.

In another aspect, converting the packetized data includes including an address corresponding to the mining proxy in a source MAC address field.

In one aspect, a mining proxy includes a processor configured to process packetized data, a sniffer circuit coupled to the processor, wherein the sniffer circuit is configured to determine whether packetized data received from a mining pool server qualifies for broadcast processing, and a broadcaster circuit configured to modify the packetized data to generate broadcast data in response to determining that the packetized data qualifies for broadcast processing. The mining proxy also includes a dispatcher circuit configured to provide the broadcast data to a network interface for broadcast to a plurality of miners subscribed to the mining proxy.

The foregoing and other example implementations each may optionally include one or more of the following features, alone or in combination. Some example implementations include all the following features in combination.

In another aspect, the sniffer circuit is configured to detect that the packetized data includes a set difficulty job or a notify job.

In another aspect, the network interface is configured to send the broadcast data to the plurality of miners using a layer 2 broadcast mechanism without performing Transmission Control Protocol operation from the mining proxy to each of the miners.

In another aspect, the packet creation circuit is configured to convert the packetized data into a layer 2 broadcast frame.

In another aspect, the layer 2 broadcast frame does not include an Internet Protocol header and does not include a Transmission Control Protocol header.

In another aspect, the packet creation circuit is configured to generate an Ethernet frame header having a destination MAC address field including a broadcast address, extract a payload from the packetized data, and append the payload to the Ethernet frame header.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   receiving, within a mining proxy, packetized data;
   determining, using the mining proxy, whether the packetized data qualifies for broadcast processing by, at least in part, inspecting a payload portion of each packet of the packetized data and detecting whether the payload portion of the packet specifies a selected type of job;
   in response to determining that the packetized data qualifies for broadcast processing, generating broadcast data, using the mining proxy, from the packetized data, wherein the generating broadcast data includes, at least in part, transforming the packetized data from a first protocol to a second protocol, wherein the second protocol is different from the first protocol; and
   broadcasting, using the mining proxy, the broadcast data to a plurality of miners subscribed to the mining proxy;
   wherein packets of the packetized data that do not qualify for broadcast processing are transmitted as received using the first protocol.

2. The method of claim 1, wherein the selected type of job is at least one of a notify job or a set difficulty job.

3. The method of claim 1, wherein the first protocol is Transmission Control Protocol/Internet Protocol (TCP/IP) and the second protocol is Ethernet.

4. The method of claim 1, wherein:
   the generating broadcast data includes converting the packet into a layer 2 broadcast frame; and
   the broadcasting includes sending the broadcast data to the plurality of miners using a layer 2 broadcast mechanism without performing a Transmission Control Protocol operation from the mining proxy to each of the miners.

5. The method of claim 4, wherein the generating broadcast data includes removing a TCP/IP header from the packet and updating Media Access Control (MAC) header information.

6. The method of claim 4, wherein the converting the packetized data comprises:
generating an Ethernet frame header having a destination Media Access Control (MAC) address field including a broadcast address;
extracting a payload from the packetized data; and
appending the payload to the Ethernet frame header.

7. The method of claim 6, wherein the generating the Ethernet frame header comprises:
including an address corresponding to the mining proxy in a source MAC address field.

8. A system, comprising:
a processor configured to initiate operations including:
receiving packetized data;
determining whether the packetized data qualifies for broadcast processing by, at least in part, inspecting a payload portion of each packet of the packetized data and detecting whether the payload portion of the packet specifies a selected type of job;
in response to determining that the packetized data qualifies for broadcast processing, generating broadcast data from the packetized data, wherein the generating broadcast data includes, at least in part, transforming the packetized data from a first protocol to a second protocol, wherein the second protocol is different from the first protocol; and
broadcasting the broadcast data to a plurality of miners subscribed to a mining proxy;
wherein packets of the packetized data that do not qualify for broadcast processing are transmitted as received using the first protocol.

9. The system of claim 8, wherein the selected type of job is at least one of a notify job or a set difficulty job.

10. The system of claim 8, wherein the first protocol is Transmission Control Protocol/Internet Protocol (TCP/IP) and the second protocol is Ethernet.

11. The system of claim 8, wherein:
the generating broadcast data includes converting the packet into a layer 2 broadcast frame; and
the broadcasting includes sending the broadcast data to the plurality of miners using a layer 2 broadcast mechanism without performing a Transmission Control Protocol operation from the mining proxy to each of the miners.

12. The system of claim 11, wherein the generating broadcast data includes removing a TCP/IP header from the packet and updating Media Access Control (MAC) header information.

13. The system of claim 11, wherein the converting the packetized data comprises:
generating an Ethernet frame header having a destination Media Access Control (MAC) address field including a broadcast address;
extracting a payload from the packetized data; and
appending the payload to the Ethernet frame header.

14. The system of claim 13, wherein the converting the packetized data comprises:
including an address corresponding to the mining proxy in a source MAC address field.

15. A mining proxy, comprising:
a processor configured to perform one or more administrative operations;
a sniffer circuit coupled to the processor, wherein the sniffer circuit is configured to determine whether packetized data received from a mining pool server qualifies for broadcast processing by, at least in part, inspecting a payload portion of each packet of the packetized data and detecting whether the payload portion of the packet specifies a selected type of job;
a broadcaster circuit configured to generate broadcast data from the packetized data in response to determining that the packetized data qualifies for broadcast processing, wherein the broadcaster circuit generates the broadcast data by, at least in part, transforming the packetized data from a first protocol to a second protocol, wherein the second protocol is different from the first protocol; and
a dispatcher circuit configured to provide the broadcast data to a network interface for broadcast to a plurality of miners subscribed to the mining proxy;
wherein packets of the packetized data that do not quality for broadcast processing are transmitted as received using the first protocol.

16. The mining proxy of claim 15, wherein selected type of job is at least one of a notify job.

17. The mining proxy of claim 15, wherein first protocol is Transmission Control Protocol/Internet Protocol (TCP/IP) and the second protocol is Ethernet.

18. The mining proxy of claim 15, wherein:
the generating broadcast data includes converting the packet into a layer 2 broadcast frame; and
the broadcasting includes sending the broadcast data to the plurality of miners using a layer 2 broadcast mechanism without performing a Transmission Control Protocol operation from the mining proxy to each of the miners.

19. The mining proxy of claim 18, wherein the generating broadcast data includes removing a TCP/IP header from the packet and updating Media Access Control (MAC) header information.

20. The mining proxy of claim 18, wherein the broadcaster circuit is configured to generate an Ethernet frame header having a destination Media Access Control (MAC) address field including a broadcast address, extract a payload from the packetized data, and append the payload to the Ethernet frame header.

* * * * *